(12) United States Patent
Helot et al.

(10) Patent No.: US 12,189,839 B2
(45) Date of Patent: Jan. 7, 2025

(54) VEHICLE COMPRISING A DISPLAY DEVICE AND AN ELECTRONIC CONTROL UNIT

(71) Applicant: AUDI AG, Ingolstadt (DE)

(72) Inventors: Jacques Helot, Ingolstadt (DE); Ulrich Mueller, Ingolstadt (DE); Sewon Chun, Seoul (KR); Jieun Song, Seoul (KR); Soyoung Kim, Seoul (KR)

(73) Assignee: AUDI AG, Ingolstadt (DE)

( * ) Notice: Subject to any disclaimer, the term of this patent is extended or adjusted under 35 U.S.C. 154(b) by 278 days.

(21) Appl. No.: 17/416,014

(22) PCT Filed: Dec. 16, 2019

(86) PCT No.: PCT/EP2019/085342
§ 371 (c)(1),
(2) Date: Jun. 18, 2021

(87) PCT Pub. No.: WO2020/127043
PCT Pub. Date: Jun. 25, 2020

(65) Prior Publication Data
US 2022/0066548 A1    Mar. 3, 2022

(30) Foreign Application Priority Data
Dec. 19, 2018   (EP) ..................................... 18213941

(51) Int. Cl.
*G06F 3/01*       (2006.01)
*B60K 35/00*    (2006.01)
(Continued)

(52) U.S. Cl.
CPC .............. *G06F 3/012* (2013.01); *B60K 35/00* (2013.01); *B60N 2/0224* (2013.01);
(Continued)

(58) Field of Classification Search
CPC ................ B60K 35/00; B60K 2370/11; B60K 2370/171; B60K 2370/1523;
(Continued)

(56) References Cited

U.S. PATENT DOCUMENTS 6,907,685 B1 *   6/2005   Falkner .................. B60Q 1/302
                                                                    40/552
11,417,109 B1 *  8/2022   Theimer .................. G06N 3/08
(Continued)

FOREIGN PATENT DOCUMENTS

DE        102007015877 A1    10/2008
DE     10 2010 048 745 A1     4/2012
(Continued)

OTHER PUBLICATIONS

International Search Report (Form PCT/ISA/210); mailed Mar. 31, 2020 in corresponding PCT Application No. PCT/EP2019/085342 (4 pages).
(Continued)

*Primary Examiner* — Phi Hoang
(74) *Attorney, Agent, or Firm* — STAAS & HALSEY LLP

(57) ABSTRACT

A display device and an electronic control unit are included in a vehicle. A graphical user interface of the display device is configured to display a graphic display object. The electronic control unit is configured to receive an orientation signal of a vehicle element. The orientation signal includes information about at least one of a position and an orientation of the vehicle element being in at least one of a first element position and a first element orientation. The electronic control unit is configured to adjust a position of the graphical user interface as a function of, or based on, the
(Continued)

orientation signal, such that a position of the graphical user interface relative to the vehicle element is within a predefined tolerance.

14 Claims, 2 Drawing Sheets

(51) Int. Cl.
*B60N 2/02* (2006.01)
*G06F 3/0484* (2022.01)
*B60K 35/10* (2024.01)
*B60K 35/22* (2024.01)
*B60K 35/28* (2024.01)
*B60K 35/53* (2024.01)
*B60K 35/60* (2024.01)
*B60K 35/65* (2024.01)
*B60K 35/81* (2024.01)

(52) U.S. Cl.
CPC ............ *G06F 3/0484* (2013.01); *B60K 35/10* (2024.01); *B60K 35/22* (2024.01); *B60K 35/28* (2024.01); *B60K 35/53* (2024.01); *B60K 35/60* (2024.01); *B60K 35/65* (2024.01); *B60K 35/81* (2024.01); *B60K 2360/11* (2024.01); *B60K 2360/1523* (2024.01); *B60K 2360/171* (2024.01); *B60K 2360/741* (2024.01); *B60K 2360/785* (2024.01)

(58) Field of Classification Search
CPC .......... B60K 2370/741; B60K 2370/52; B60K 2370/67; B60K 2370/1438; B60K 2370/175; B60K 2370/21; B60K 2370/1529; B60K 2370/31; B60K 2370/1442; B60K 2370/785; B60K 2370/736; B60K 2370/92; B60K 37/06; B60N 2/0224; G06F 3/012; G06F 3/0484
See application file for complete search history.

(56) References Cited

U.S. PATENT DOCUMENTS

| | | | |
|---|---|---|---|
| 2003/0146934 A1* | 8/2003 | Bailey | G06F 8/38 |
| | | | 715/765 |
| 2010/0318266 A1* | 12/2010 | Schaaf | B60N 2/0228 |
| | | | 701/49 |
| 2017/0232908 A1 | 8/2017 | Jung | |
| 2018/0093611 A1 | 4/2018 | Kim et al. | |
| 2018/0222490 A1* | 8/2018 | Ishihara | B60W 40/08 |
| 2018/0240817 A1* | 8/2018 | Umezaki | H01L 27/1225 |
| 2018/0247160 A1* | 8/2018 | Rohani | B60W 10/18 |
| 2018/0304749 A1 | 10/2018 | Cho et al. | |
| 2019/0215882 A1* | 7/2019 | Kim | G06K 7/1417 |
| 2019/0258055 A1* | 8/2019 | Detwiler | G02F 1/167 |

FOREIGN PATENT DOCUMENTS

| | | | |
|---|---|---|---|
| DE | 102014208740 | A1 | 11/2015 |
| DE | 102016210057 | A1 | 12/2017 |
| DE | 102016212813 | A1 | 1/2018 |
| DE | 102016218602 | A1 | 3/2018 |
| DE | 10 2017 212 518 | B3 | 6/2018 |
| EP | 1978396 | A2 | 10/2008 |
| EP | 18213941.0 | | 12/2018 |
| WO | WO 2007/121977 | A2 | 11/2007 |
| WO | PCT/EP2019/085342 | | 12/2019 |

OTHER PUBLICATIONS

Written Opinion (Form PCT/ISA/237); mailed Mar. 31, 2020 in corresponding PCT Application No. PCT/EP2019/085342 (8 pages).
Extended European Search Report dated Mar. 7, 2019 in corresponding European Patent Application No. 18213941.0 (5 pages).
International Preliminary Report on Patentability (Form PCT/IB/373); dated Jun. 16, 2021 in corresponding PCT Application No. PCT/EP2019/085342 (1 page).
Chinese Office Action issued in counterpart Chinese Application No. 201980083756.8 dated Nov. 29, 2023.

* cited by examiner

VEHICLE COMPRISING A DISPLAY DEVICE AND AN ELECTRONIC CONTROL UNIT

CROSS-REFERENCE TO RELATED APPLICATIONS

This application is a U.S. national stage of International Application No. PCT/EP2019/085342, filed on Dec. 16, 2019. The International Application claims the priority benefit of European Patent Application No. 18213941.0 filed on Dec. 19, 2018. Both International Application No. PCT/EP2019/085342 and European Patent Application No. 18213941.0 are incorporated by reference herein in their entirety.

BACKGROUND

Described herein is a vehicle including a display device and an electronic control unit.

A display device nowadays has become an integral part of a vehicle. A display device usually includes a graphical user interface (GUI) or a touch screen. A user, who can be a driver of the vehicle can communicate with and/or operate other devices in the vehicle remotely by use of the graphical user interface. In this manner, operating functions or driver assistant functions of the other devices of the vehicle can be made available to the user for selection. Usually, display devices are integrated within a dashboard or within a central console of the vehicle. Furthermore, there is always a need to increase the comfortability or make the driving and travel in the vehicle as pleasant as possible, due to which there are certain graphical user interfaces which are integrated in the window panels of the driver's window. This allows people in the vehicle to be seated more freely, and not always in the direction of the road but slightly angled towards the window, for example. Furthermore, this enables the user to communicate with the other devices in a comfortable manner, since the user can easily reach the window panel while driving the vehicle. However, when the vehicle seat on which the user is sitting, is adjusted or changed to a different position and/or orientation by the user, the graphical user interface of the display device may not be reachable to the user.

German Patent Application No. 10 2016 218 602 A1 describes a display device for an altered perception of the outside world of a vehicle through, for example, a window panel of the vehicle. The vehicle includes at least one panel which is designed as a display device and, on one hand, can be controlled in such a way that it appears transparent and enables a passenger of the vehicle to visually perceive the outside world, and, on the other hand, can be controlled in such a way that the image contents can be displayed on it. However, an adjustability of the display device including a user-interface, with a change in the vehicle seat position and/orientation is not disclosed.

German Patent Application No. 10 2014 208 740 A1 describes a display device having at least one glass panel and a display device coupled to the glass panel, wherein the at least one glass panel and the display device are mechanically connected to one another. However, an adjustability of a position of the display device with a user-interface with a change in the vehicle seat position and/orientation is not disclosed.

German Patent Application No. 10 2007 015 877 A1 describes a detection unit with an interface, where the detection unit detects a special adjustment of a vehicle part. An arithmetic and logic unit is provided for positioning of a virtual image as a function of the special adjustment of the vehicle part. An input unit is provided for correction of the position of the virtual image. A memory unit is provided for storage of control data to determine connection between the spatial adjustment of the vehicle part and positioning of the virtual image. However, an integration of the display device into a vehicle part, such a window panel, is not disclosed.

SUMMARY

Aspects of the disclosure described herein are directed to a vehicle including a display device and an electronic control unit which enables a user to obtain a clear and comfortable view of a display content of a graphical user interface of the display device and at the same time that the user is able to reach the graphical user interface in a comfortable manner with respect to the position or orientation of the user seated in the vehicle. The term "clear display" implies that the user can view the display contents in an ergonomically comfortable manner, such that all information of the display content are perceivable by the user.

This may be accomplished by the display device and electronic control unit described herein. Advantageous developments with convenient and non-trivial further embodiments are also described herein.

Aspects of the disclosure are based on the realization that a display device should be at a reachable distance from a user in a vehicle, such that the user is able to reach, for example by his hand, the display device in a comfortable manner, when required. Described herein is a vehicle including a display device and an electronic control unit. The display device includes a graphical user interface which is designed to display at least one graphic display object. The at least one graphic display object can be for example, a logo and/or an app and/or an output displaying region of the graphical user interface. The electronic control unit is designed to receive at least one input signal from the user-interface and transmit the at least one input signal to at least one device in the vehicle. The input signal can be provided by the user by use of a touch signal and/or a voice signal and/or a gesture. For example, if the user touches a corresponding app on the graphical user interface, then an input signal is sent by use of the electronic control unit to a corresponding device of the vehicle, for example, an infotainment system, including information such as the activation of the infotainment system as desired by the user. The electronic control unit is designed to receive at least one functionality signal from the at least one device in the vehicle and transmit the at least one functionality signal as an output signal to the display device. Hence, the output signal can be outputted through the graphical user interface as a video signal and/or an audio signal and/or a haptic signal corresponding to the input signal that had been sent by the user through the graphical user interface.

As described herein, the electronic control unit is designed to receive an orientation signal of at least one vehicle element. The orientation signal includes information about a position and/or an orientation of the at least one vehicle element being in a first element position and/or orientation. The at least one vehicle element can be, for example, a steering wheel and/or a vehicle seat and/or a rearview mirror inside the vehicle and/or a rearview mirror outside the vehicle. The orientation and/or position of the at least one vehicle element can be adjusted by a user according to his convenience and/or position and/or size. The information regarding the size and/or position of the user can be estimated by use of the position and/or orientation of the aforementioned at least one vehicle element in a first element position and/or orientation. Furthermore, the electronic control unit is designed to adjust a position of the graphical user interface as a function of the orientation signal of the at least one vehicle element, such that a relative position of the graphical user interface relative to the at least one vehicle element lies within a predefined tolerance. In other words, the electronic control unit is designed to adjust the position of the graphical user interface, such the graphical user interface is always positioned or lies within a predefined tolerance from the vehicle element. Hence, the electronic control unit is designed to determine a position and/or orientation of the user through the determination of the position and/or orientation of the at least one vehicle element and adjusts the position of the graphical user interface accordingly, such that the graphical user interface is at a readable position of the user. This is of advantage, because this ensures that the graphical user interface is of a constant position or distance, such that the user can have a comfortable access of the display contents of the graphical user interface and/or the user can have a comfortable reachability of the graphical user interface of the display device. Furthermore, in case of autonomous driving or self-driving of the vehicle, the vehicle seat can be displaced by larger distances, such as 70 cm to 80 cm. Furthermore, in the case of autonomous driving, the user doesn't have to sit in the direction of travel facing the windscreen, and instead the user can be angled, for example towards a window panel of a door of the vehicle. In this case, in accordance with the display device and electronic control unit as described herein, an advantage that the graphical user interface can be adjusted to a new position accordingly may be obtained, so that the graphical user interface can be comfortably accessed by the user sitting on the vehicle seat. Hence, a direct coupling between the graphical user interface and the at least one vehicle element can be realized.

Also described herein are embodiments that provide features which afford additional technical advantages.

In an embodiment, the graphical user interface can include a display surface including a pixel matrix. The display surface, for example is designed as a transparent screen with a large number of monochromatic organic light emitting diodes (OLED). The organic light emitting diodes can be distributed over a total area of the transparent screen. Furthermore, the display surface can be designed as a transparent screen with a large number of transparent organic light emitting diodes (TOLED). The display surface can be a so called polymer display liquid crystal screen (PDLC) or a thin-film transistor screen (TFT), which can be used during the daytime, when there is a light shining into the vehicle. In a non-actuated state each pixel element of the display surface can remain transparent. This is of advantage, because this enables a formation of a display output signal which can be perceived by the user in a pleasant and comfortable manner.

In an embodiment, the display device can include a control circuitry, wherein the control circuitry can be designed to actuate at least one pixel element of the pixel matrix for displaying the at least one graphic display object, wherein in a non-actuated state each pixel element is transparent. In other words, the control circuitry can control an actuation of the pixel elements at a location or position corresponding to the at least one graphic display object, so that the at least one graphic display object can be displayed on the graphical user interface for the user. If at a point of time, a graphic display object is needed to be displayed on a particular location on the graphical user interface, the control circuitry can actuate a plurality of pixel elements at that particular location, which in turn enables the plurality of pixel elements at that particular location of the display surface of the graphical user interface to radiate a monochromatic or a polychromatic corresponding to the at least one graphic display object. However, the other pixel elements can correspond to a non-actuated state and hence remain transparent, for example about 70-90 percent transparent. This enables the rest of the display surface, which is not occupied by the at least one graphic display object to remain transparent. This is of advantage, because this enables the graphical user interface to be integrated in at least one transparent element of the vehicle, such as in front of a wind screen or a window panel, since a user can be able to view the environment outside the vehicle through the transparent elements and at the same time can also have access to the display contents displayed by the graphical user interface, which is integrated into the transparent element. Furthermore, a movement of the graphical user interface, in order to adjust the position of the graphical user interface, is achieved by shifting an actuation of pixel elements of the pixel matrix. In other words, the electronic control unit receives the orientation signal of the at least one vehicle element and signals to the control circuitry of the display device, which in turn adjusts the activation of the pixel elements of the pixel matrix of the display surface as a function of the orientation signal. Hence, an adjustment of the position of the graphical user interface can be achieved by shifting the activation of the pixel elements without any mechanical movement of the graphical user interface or the display device. This is of advantage, because this enables a robust and stable adjustment of the position of the graphical user interface in accordance with the position and/or orientation of the at least one vehicle element.

In an embodiment, the graphical user interface is integrated into a window panel of a door of the vehicle, such that the graphical user interface occupies at least a part of the window panel. The window panel can be in the form of a glass panel, that is the window panel can be transparent or almost transparent. In other words, the graphical user interface can be a part of the window panel which is transparent in itself, since the graphical user interface includes pixel elements which in the non-actuated state can be transparent and when being actuated by the control circuitry the pixel elements of the pixel matrix emit light to display the at least one graphic display object. This enables the user in the vehicle to have access to the graphical user interface which is integrated into the window panel of the door of the vehicle comfortably, since it is at a very reachable distance from where the user is seated in the vehicle and at the same time due to the nature of the graphical user interface the user can also access the view of the environment outside of the vehicle through the transparent screen of the graphical user interface.

In an embodiment, the at least one vehicle element is a vehicle seat. This is of advantage, because the information regarding the position and/or orientation of the vehicle seat can provide information regarding the position and/or orientation of the user sitting on the vehicle seat. Hence, the electronic control unit based on the orientation signal including the aforementioned information can adjust the position of the graphical user interface accordingly. In other words, the graphical user interface can be adjusted at a distance which is close enough to the user sitting on the vehicle seat, such that the user can have a comfortable and clear access of the display contents on the graphical user interface and at the same time have a clear and comfortable accessibility for accessing different functionalities offered by the graphical user interface of the display device.

In an embodiment, the electronic control unit is designed to compute an estimated head position of the head of the user sitting on the vehicle seat from the orientation signal of the vehicle seat. A rotation of the seat or of the head of the user sitting on the vehicle seat about an axis which is orthogonal to a plane of a vehicle floor can be taken into account for the adjustment of the positioning of the graphical user interface. Furthermore, the electronic control unit is designed to adjust the position of the graphical user interface in accordance with the estimated head position, such that the relative position of the graphical user interface relative to the estimated head position lies within the predefined tolerance. In other words, a vehicle seat which usually includes three main parts, such as the headrest, the backrest and the seat area, each of the aforementioned parts can be adjusted according to the comfort and/or position and/or size of the user by use of the actuators or the servomotors which can be integrated into the vehicle seat. That is, on the basis of the actuators or the servomotors, the user can adjust the position of the headrest, the backrest and the seat area and hence, can change the position and/or orientation of the vehicle seat accordingly. Based on the position and/orientation of each of the aforementioned seat parts of the vehicle seat, the electronic control unit can compute and determine an estimated head position of the head of the user seated on the corresponding vehicle seat. This is of advantage, because based on the estimated head position the electronic control unit can adjust the position of the graphical user interface, such that the relative position of the graphical user interface relative to the estimated head position of the user lies within a predefined tolerance. In other words, the graphical user interface can be adjusted to a position or distance from the estimated head position of the user, such that the user can have a clear accessibility of the display contents of the graphical user interface and/or at the same time, the user can be able to access different functionalities of the graphical user interface by providing input signals, for example by touch the graphical user interface by hand. Hence, the user can easily reach the graphical user interface while being seated on the corresponding vehicle seat.

In an embodiment, the display device is attached to an edge of the window panel of the door of the vehicle by use of a holding arrangement (movable holder), wherein the holding arrangement can be designed to be movable. In other words, the holding arrangement can be in the form of a mechanical rack or a ribbon-like structure which can be attached or arranged alongside the edge, for example beneath the window panel of the door of the vehicle, such that the graphical user interface is attached by use of the holding arrangement. The electronic control unit can be designed to move the holding arrangement upon receiving the orientation signal from the at least one vehicle element, such that the display device, which can held by the holding arrangement, can be moved or displaced from one position to the other as per the orientation signal received by the electronic control unit. This is of advantage, because this enables a simple and robust holding arrangement by which the display device can be easily adjusted from one position to another by use of the electronic control unit, such that the relative position of the graphical user interface relative to the at least one vehicle element lies within the predefined tolerance.

In an embodiment, the vehicle can include a gaze monitoring unit which can be designed to monitor a position and/or orientation of the head of the user. The electronic control unit can be designed to adjust the position of the graphical user interface in accordance with the monitored position and/or orientation of the head of the user, wherein a correction vector for correcting the information from the orientation signal is estimated, such that the relative position of the graphical user interface relative to the head of the user lies within a predefined tolerance. For example, the vehicle may include a camera which can be enabled to monitor the position and/or orientation of the head of the user, such that the camera can send a view signal to the electronic control unit. After receiving the view signal, the electronic control unit can calculate the correction vector to determine a corrected position and/or orientation of the head of the user, for example a relative position and/or orientation of the head of the user relative to the headrest of the vehicle seat. The information of the orientation signal can be corrected on the basis of the correction vector. Hence, the electronic control unit can adjust the position of the graphical user interface in accordance with the monitored position and/or orientation of the head of the user. This can enable the placement of the graphical user interface at the position which can be easily and comfortably accessed by the user while driving the vehicle or being seated on the vehicle seat. Furthermore, this can help in a quicker adjustment of the position of the graphical user interface by use of the electronic control unit as per the view signal provided by the camera.

In an embodiment, the electronic control unit can be designed to receive an adjustment signal for the at least one vehicle element, wherein the adjustment signal is received from a user through the user-interface, wherein the adjustment signal can include information about a desired position and/or orientation of the at least one vehicle element. In other words, a position and/or an orientation of a vehicle element, such as the vehicle seat and/or the steering wheel and/or the rearview mirror in the interior of the vehicle and/or the rearview mirror outside of the vehicle can be adjusted by use of the adjustment signal which can be provided by the user to the graphical user interface or the user-interface. For example, the position of the vehicle seat, that is the position of the headrest and/or the backrest and/or the seat area can be arranged or adjusted by use of the adjustment signal. For example, the graphical user interface can display a logo of a structure of a vehicle seat including three parts, such as the headrest, backrest, and seat area. A user can adjust the position and/or orientation of each part of the vehicle seat, for example by a swiping movement of his finger while touching the respective logo on the graphical user interface, to a desired position and/or orientation in which he seems or feels comfortable for himself. Based on the adjustment signal, the electronic control unit can send the adjustment signal to the vehicle seat which can enable the actuators or the servomotors to displace the vehicle seat from the first element position to the desired element position, as desired by the user. Furthermore, the electronic control unit can be designed to adjust the position and/or orientation of the at least one vehicle element from the first element position and/or orientation to a desired element position and/or orientation in accordance with the adjustment signal for the at least one vehicle element. This is of advantage, because this enables a comfortable adjustment of the at least one vehicle element, for example the vehicle seat and/or the steering wheel, by the user by use of the adjustment signal through the graphical user interface of the display device. Other functionalities such as media/navigation or car settings can also be controlled.

In an embodiment, during and/or after the adjusting of the position and/or orientation of the at least one vehicle element from the first element position and/or orientation to the desired element position and/or orientation as a function of the adjustment signal for the at least one vehicle element, the electronic control unit can be designed to receive the orientation signal of the at least one vehicle element, wherein the orientation signal includes information about the position and/or orientation of the at least one vehicle element in the desired element position and/or orientation. Furthermore, the electronic control unit is designed to adjust the position of the graphical user interface as a function of the orientation signal of the at least one vehicle element, such that the relative position of the graphical user interface relative to the at least one vehicle element in the desired element position and/or orientation lies within the predefined tolerance. In other words, the adjustment of the position of the graphical user interface during the adjustment of the position and/or orientation of the at least one vehicle element can be performed dynamically and/or in real time, so that the relative position of the graphical user interface relative to the at least one vehicle element in the desired position and/or orientation lies within the predefined tolerance. This is of advantage, because this enables the user during and/or after the change or adjustment of the position and/or orientation of the vehicle element, to have a comfortable and clear access to the graphical user interface as well as to have an access to the different functionalities offered by the graphical user interface of the display device. It is further thinkable that the electronic control unit can include a storage unit (a memory), in which data related to the position and/or orientation of a plurality of the vehicle elements, such as the vehicle seat and/or the steering wheel and/or the rearview mirror in the interior of the vehicle and/or the rearview mirror on the exterior of the vehicle, can be stored as per the user's desire or the user's choice in a user-profile of the user. For example, when a user enters a vehicle, the user can log in to his or her profile by use of the graphical user interface or the user-interface of the display device. After logging into the user-profile, the electronic control unit can access the stored user-profile of the corresponding user and obtain the preferred or desired position and/or orientation of the respective vehicle elements and adjust the corresponding vehicle elements accordingly as per the stored user-profile of the corresponding user. This enables an efficient and an automatic adjustment of the different vehicle elements as per the desire of the user. It is further thinkable that the storage unit of the electronic control unit can include an artificial neural network algorithm and a data base. The data base can include the different predefined positions of the graphical user interface corresponding to a respective position and/or orientation of various vehicle elements as per the user-profile. When the corresponding user adjusts the corresponding vehicle elements to a defined position and/or orientation, then the electronic control unit can access the data base including the corresponding position and/or orientation for each of the corresponding vehicle elements and estimate the position of the graphical user interface accordingly, by use of the artificial neural network algorithm.

Also described herein are various combinations of the features of the described embodiments, if not stated otherwise.

BRIEF DESCRIPTION OF THE DRAWINGS

In the following aspects and advantages will become more apparent and more readily appreciated from the following description of various examples, taken in conjunction with the accompanying drawings, of which.

DETAILED DESCRIPTION

Figure 1:
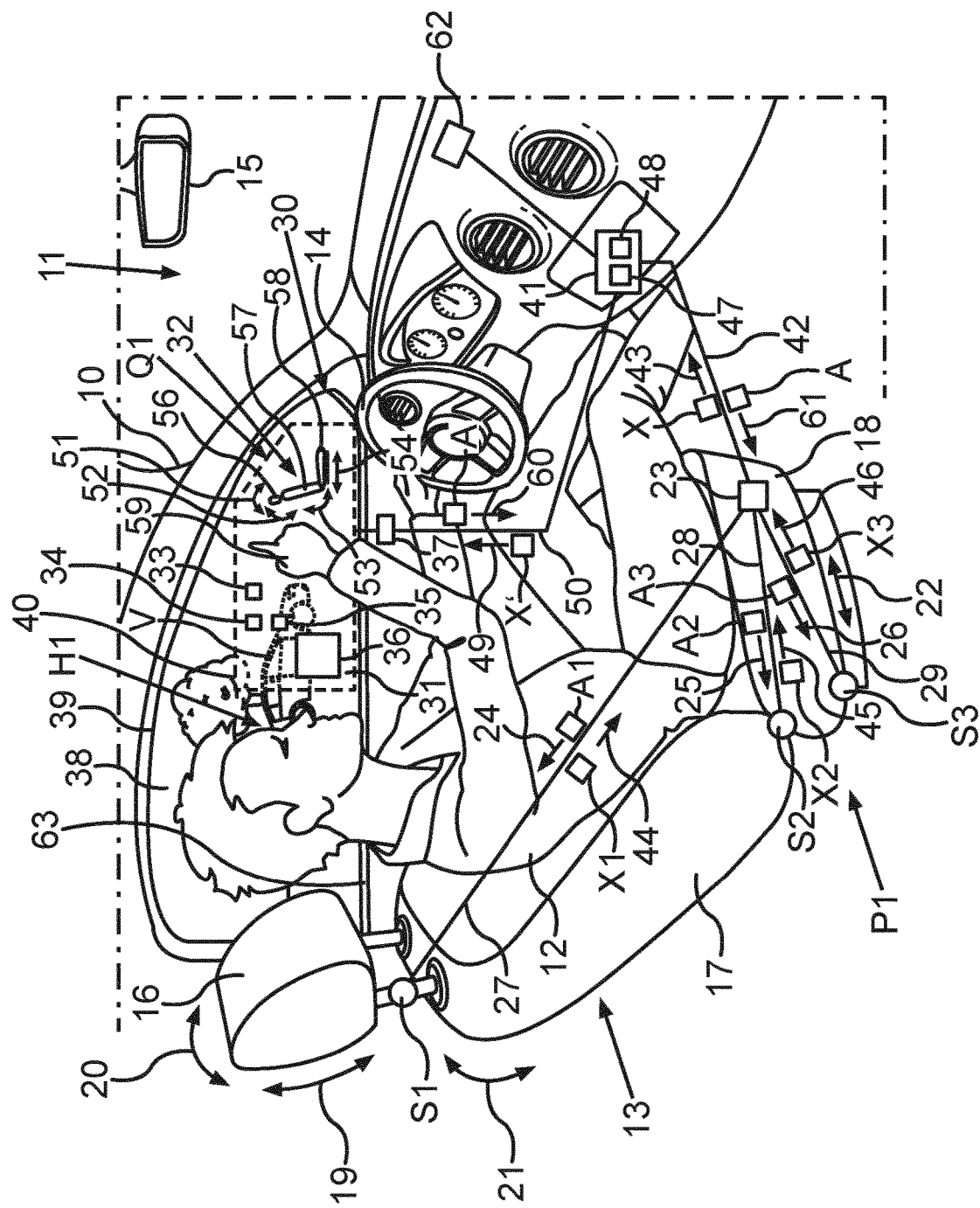
FIG. 1 is a schematic illustration of an embodiment of the vehicle, according to examples of the disclosure.

The embodiments explained herein are example embodiments. However, in the embodiments, the described components of the embodiments each represent individual features which are to be considered independently of each other and which each develop the disclosure also independently of each other and thereby are also to be regarded as a component in an individual manner or in another manner than the shown combination. Furthermore, the described embodiments can also be supplemented by further features already described.

In the drawings identical reference signs indicate elements that provide the same function.

Figure 2:
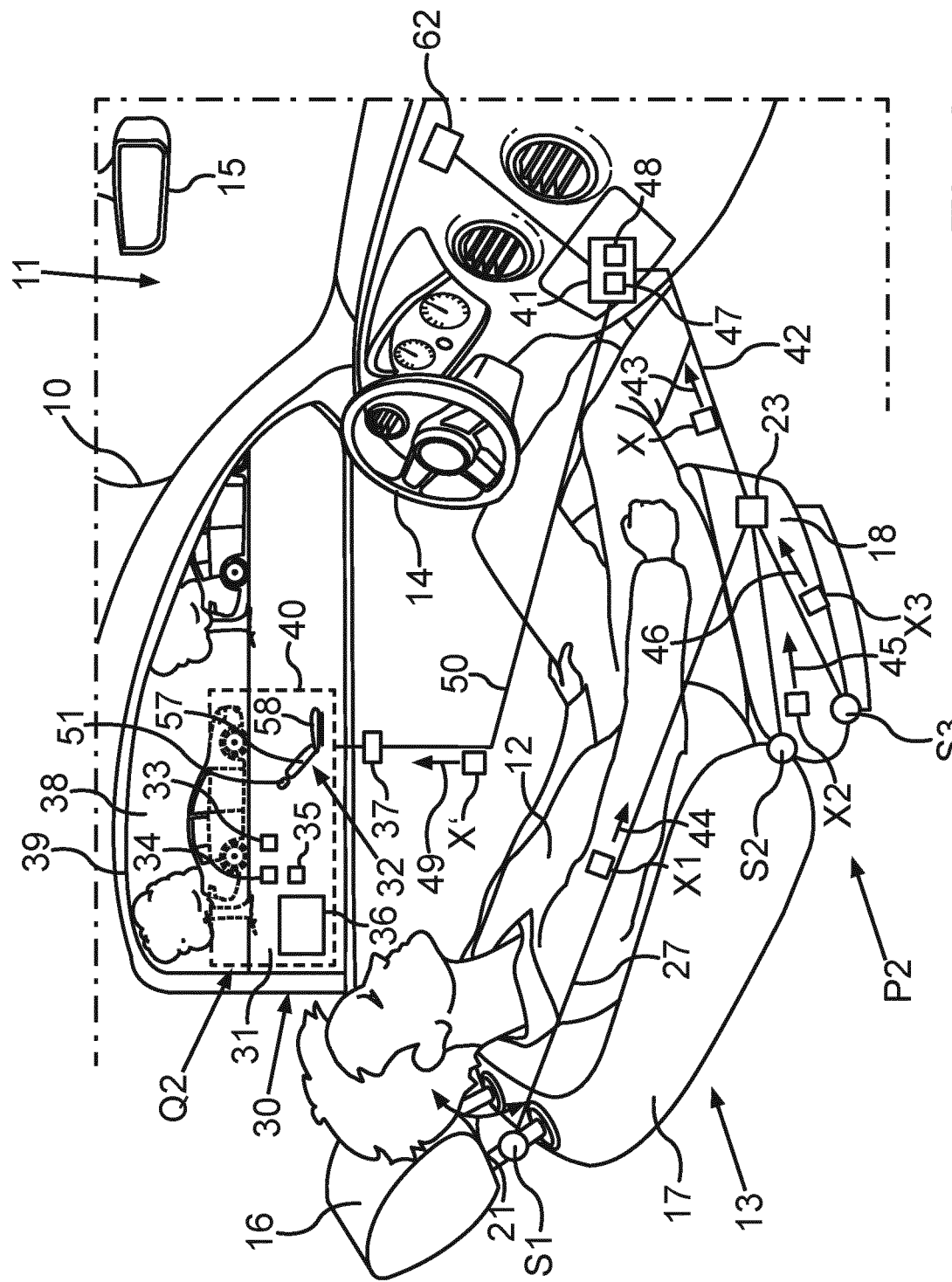
FIG. 2 is a schematic illustration of an embodiment of the vehicle, according to examples of the disclosure.

FIG. 1 shows a schematic illustration of an interior room 11 of a vehicle 10. The vehicle 10 can be manually driven by a user 12 and/or a semiautonomous and/or an autonomous or self-driving vehicle 10. The user 12, who can be the driver of the vehicle 10, can be seated on a vehicle seat 13 and can steer the vehicle 10 manually by use of a steering wheel 14. The vehicle 10 may include various vehicle elements 13, 14 and 15, such as the vehicle seat 13, the steering wheel 14 and/or a rearview mirror 15 in the interior room 11 of the vehicle 10. The vehicle seat 13 can be adjustable from a first element position and/or orientation P1 to a desired element position and/or orientation P2, as shown in FIG. 2. Furthermore, the vehicle seat can be rotatable adjusted about an axis orthogonal to the vehicle floor (not shown in the drawings). For the sake of understandability, the vehicle element is confined to the vehicle seat 13 in FIG. 1 and FIG. 2, wherein the first element position and/or orientation P1 may be referred to the first vehicle seat position and/or orientation P1, similarly, the desired element position and/or orientation P2 may be referred to the desired vehicle seat position and/or orientation P2. The vehicle seat 13 can include three parts, a headrest 16, a backrest 17 and a seating area 18.

The vehicle seat position and/or orientation may be adjustable in the following manner: the headrest 16 may be height adjustable, as shown by a double sided arrow 19. Furthermore, the headrest 16 may be sideways adjustable, as shown by a double sided arrow 20. The backrest 17 may be sideways adjustable, as shown by a double sided arrow 21 and finally, the seat area 18 may be lengthwise adjustable, as shown by a double sided arrow 22. An adjustment of the headrest 16, the backrest 17 and the seat area 18 may be achieved by use of an activation of actuators S1, S2 and S3 respectively. The activation of the actuator S1 may be realized by a seat control unit 23, which may send a sub-activation signal A1, as shown by an arrow 24 along a path 27. Similarly, the actuator S2 may be actuated by the seat control unit 23, which may send a sub-activation signal A2, as shown by an arrow 25 along a path 28. Finally, the actuator S3 may be actuated by the seat control unit 23, which may send a sub-activation signal A3 along the path 29, as shown by an arrow 26. The sub-activation signals A1, A2, A3 can be sent from the seat control unit 23 to the actuators S1, S2 and S3 either wirelessly or by use of a wired connection.

Furthermore, the vehicle 10 can include a display device 30. The display device 30 may include a graphical user interface 31, which is designed to function as a user-interface and/or for displaying at least one graphic display object 32, 33, 34, 35, and 36. The graphical user interface 31 may include a display surface including a pixel matrix. The display device 30 may include a control circuitry 37, wherein the control circuitry 37 is designed to actuate at least one pixel element of the pixel matrix for displaying the at least one graphic display object 32, 33, 34, 35, and 36. Furthermore, in a non-actuated state the pixel element may remain transparent. The graphical user interface 31 including a display surface can be in the form of a TOLED screen or an OLED screen or a PDLC screen or a TFT screen, especially when there is enough light coming from outside the vehicle. The at least one graphic display object 32, 33, 34, 35, and 36 as shown in FIG. 1 and FIG. 2, can be a digital image of the vehicle seat 13, which is referred to as a digital vehicle seat 32, a first app 33, a second app 34, a third app 35 and an output panel 36. The graphical user interface 31 may be integrated into a window panel 38 of a door 39 of the vehicle 10, such that the graphical user interface 31 can occupy at least a part of the window panel 38. The part of the window panel 38 that is occupied by the graphical user interface 31 is shown by a region surrounded by a dotted line 40, as shown in FIG. 1 and FIG. 2.

FIG. 1 depicts that the user 12 can have a view of the environment outside of the vehicle 10 through the window panel 38, which can be made of glass, which in turn enables the window panel 38 to be transparent. The graphical user interface 31 which may be a TOLED screen can depict the graphic display object 32, 33, 34, 35, and 36 on one side and at the same time the regions of the graphical user interface 31 which are not occupied by the graphic display object 32, 33, 34, 35, and 36 remain transparent. This enables the user 12 to have a view of the environment outside through the graphical user interface 31 which may cover a part of the view of the environment outside the vehicle 10. For example, an outside vehicle V can be seen through the window panel 38 by the user 12. A part of the outside vehicle V can be hidden behind the graphical user interface 31. However, the part of the outside vehicle V that is hidden behind the graphical user interface 31, which itself can be transparent, can be seen by the user 12. The part of the outside vehicle V which can be seen by the user 12 through the graphical user interface is depicted by the use of dotted lines for the sake of understandability. Hence, the presence of the graphical user interface 31 does not hinder the user 12 from having a clear view of the environment outside of the vehicle 10 through the window panel 38, as long as not all the pixel elements are on and as long as there are enough transparent areas to look through. At the same time, the graphical user interface 31 enables the user to view the display contents displayed by the graphical user interface 31. Furthermore, at the same time, the user can be able to access different functionalities offered by the graphical user interface 31.

The vehicle 10 can include an electronic control unit 41, wherein the electronic control unit 41 may be designed to receive at least one input signal (not shown in the drawings) from user 12 through the graphical user interface 31. For example, the user 12 can provide an input signal by use of a touch signal, so that he can access a functionality of a corresponding device. The electronic control unit 41 may be further designed to transmit the input signal to at least one device, for example, an infotainment system or a door locking unit (not shown in the drawings), of the vehicle 10 and/or to receive at least one functionality signal (not shown in the drawings) from the at least one device in the vehicle 10 and transmit the at least one functionality signal as an output signal (not shown in the drawings) to the display device 30. The output signal can be in the form of a video signal and/or an audio signal and/or a haptic signal, for example the video signal can be outputted by use of the output panel 36 of the graphical user interface 31.

The electronic control unit 41 is designed to receive an orientation signal X of at least one vehicle element, for example the vehicle seat 13, wherein the orientation signal X includes information about a position and/or an orientation of the vehicle seat 13 or the at least one vehicle element 13, 14 and 15. The orientation signal X can be sent by the seat control unit 23 to the electronic control unit 41 via a path 42, as shown by an arrow 43. For example, the actuator S1 can send a first sub-orientation signal X1 to the seat control unit 23 via the path 27, as shown by an arrow 44. Similarly, the actuator S2 can send a second sub-orientation signal X2 via the path 28, as shown by an arrow 45. Similarly, the actuator S3 can send a third sub-orientation signal X3 to the seat control unit 23 via the path 29, as shown by an arrow 46. The sub-orientation signal X1 may include information of the position and/or orientation of the headrest 16 of the vehicle seat 13 related to a fixed point in the vehicle (not shown in the drawings). The second sub-orientation signal X2 may include information about the position and/or orientation of the backrest 17 of the vehicle seat 13 with respect to the fixed point in the vehicle and similarly, the third sub orientation signal X3 may include information about the orientation and position of the seat area 18 of the vehicle seat 13 in relation to the fixed point in the vehicle. Hence, by use of the three sub-orientation signals X1, X2 and X3, the seat control unit 23 can contain a data file including the information about the position and/or orientation of each part of the vehicle seat 13. Hence, the seat control unit 23 can compute to determine the position and/or orientation of the vehicle seat 13.

FIG. 1 shows the first position and/or orientation P1 of the vehicle seat 13. The seat control unit 23 may send the orientation signal X to the electronic control unit 41, wherein the orientation signal X includes the information derived from the sub-orientation signals X1, X2, and X3. The electronic control unit 41 can further include a processor 47 and a storage unit 48, for example, random access memory (RAM), read only memory (ROM), programmable ROM (PROM), firmware, or flash memory. The electronic control unit 41 can further transmit the orientation signal X to the control circuitry 37 of the display device 30, via a path 50, as shown by an arrow 49. Furthermore, the electronic control unit 41 can be designed to adjust a position of the graphical user interface 31 as function of the orientation signal X of the at least one vehicle element 13, 14 and 15, which in this case, is the vehicle seat 13, such that a relative position of the graphical user interface 31 relative to the vehicle seat 13 lies within a predefined tolerance.

As per the embodiment of the display device 30 shown in the FIG. 1 and FIG. 2, the electronic control unit 41 can send the orientation signal X to the control circuitry 37 of the display device 30, which in turn enables an adjustment of the position of the graphical user interface 31 as a function of the orientation signal X of the vehicle seat 13 from a first position Q1, as shown in FIG. 1, to a second position Q2, as shown in FIG. 2. Furthermore, a movement of the graphical user interface 31, in order to adjust the position of the graphical user interface 31, can be achieved by shifting an actuation of pixel elements of the pixel matrix. In other words, the electronic control unit 41 receives the orientation signal X of the at least one vehicle element 13, 14 and 15, which in this case, is the vehicle seat 13, and signals by use of a signal X' to the control circuitry 37 of the display device 30, which in turn adjusts the activation of the pixel elements of the pixel matrix of the display surface as a function of the signal X'. Hence, an adjustment of the position of the graphical user interface 31 can be achieved by shifting the activation of the pixel elements without any mechanical movement of the graphical user interface 31 or the display device 30.

The graphical user interface 31 displays an image of the vehicle seat 13 in form of a digital seat 32. The digital seat 32 includes three parts analogous to the vehicle seat 13, namely a digital headrest 56 corresponding to the headrest 16, a digital backrest 57 corresponding to the backrest 17 and a digital seat area 58 corresponding to the seat area 18 of the vehicle seat 13. Furthermore, a double sided arrow 51 and a double sided arrow 52 can correspond to the double sided arrows 20 and 19 of the headrest 16 of the vehicle seat 13, respectively. Similarly, a double sided arrow 53 can correspond to the double sided arrow 21 of the backrest 17 of the vehicle seat 13 and finally, a double sided arrow 54 of the digital seat 32 can correspond to the double sided arrow 22 of the seat area 18 of the vehicle seat 13. As depicted in FIG. 1, the user 12, who may be driving the vehicle 10 manually by steering the steering wheel 14, can adjust the position and/or orientation of the vehicle seat 13 by adjusting the position and/or orientation of the digital seat 32 on the graphical user interface 31. The user 12 can provide an input signal, for example a touch signal by use of a finger of his hand 59, such that the user 12 can swipe or move his finger along the direction of the arrows 51, 52, 53, 54 of the digital seat 32 as per his convenience so that the vehicle seat 13 is adjusted from the first position and/orientation P1 to the desired position and/or orientation P2. Furthermore, while the vehicle seat 13 can be moved by touching on the graphical user interface, the graphical user interface also moves simultaneously. Furthermore, when a moving distance is short, the graphical user interface can stay for a predefined interval of time at the same position, so that it can be easier to control the graphical user interface and then jump to the next position after the predefined time interval or time out.

The electronic control unit 41 may be designed to receive an activation (or adjustment) signal A for the vehicle seat 13, wherein the activation signal A can be received from the user 12 through the graphical user interface 31, wherein the adjustment signal A includes information about the desired position and/or orientation P2 of the vehicle seat 13, as shown in FIG. 2. The activation signal A may be sent by the control circuitry 37 of the display device 30 to the electronic control unit 41 via the path 50, as shown by an arrow 60. Furthermore, the electronic control unit 41 can send the activation signal A to the seat control unit 23 via the path 42, as shown by an arrow 61. The activation signal A includes information of the position and/or orientation of the digital seat 32 which corresponds to that of the vehicle seat 13. The activation signal A can include information regarding a position and/or orientation of the digital headrest 56 in form of the sub-activation signal A1, information about a position and/or orientation of the digital backrest 57 in form of the sub-activation signal A2 and finally, information about a position and/or orientation of the of digital seat area 58 in form of the sub-activation signal A3. The seat control unit 23 can receive the activation signal A and can extract the respective sub-activation signals A1, A2, and A3 and send the respective sub-activation signals A1, A2 and A3 to the corresponding actuators S1, S2, and S3 respectively. For example, the seat control unit 23 can send the sub-activation signal A1 to the actuator S1, the sub-activation signal A2 to the actuator S2 and the sub-activation signal A3 to the actuator S3. Upon receiving each of the sub-activation signals A1, A2, and A3, the actuators S1, S2, and S3 can adjust the position and/or orientation of the respective parts, that is, the headrest 16, the backrest 17 and the seat area 18 of the vehicle seat 13. Hence, the vehicle seat 13 can be adjusted to the desired position and/or orientation P2 as desired by the user 12. Therefore, the electronic control unit 41 is designed to adjust the position and/or orientation of the at least one vehicle element 13, 14, and 15, which in this case, is the vehicle seat 13 from the first element position and/or orientation P1 to the desired element position and/or orientation P2 as a function of the activation signal A for the vehicle seat 13.

During and/or after the adjusting of the position and/or orientation of the at least one vehicle element 13, 14, and 15, which in this case, is the vehicle seat 13, from the first element position and/or orientation P1 to the desired element position and/or orientation P2 as a function of the activation signal A for the at least one vehicle element 13, the electronic unit 41 is designed to receive the orientation signal X of the at least one vehicle element 13, wherein the orientation signal X includes information about the orientation and/or position of the at least one vehicle element 13 in the desired position and/or orientation P2. In other words, during and/or after the adjustment of the position and/or orientation of the vehicle seat 13, each of the actuators S1, S2, S3 can send corresponding sub-orientation signals X1, X2, X3 to the seat control unit 23, which include new information about the position and/or orientation of each of the parts of the vehicle seat 13, that is the headrest 16, the backrest 17 and the seat area 18. The seat control unit 23 can receive the corresponding sub-orientation signals X1, X2, X3 with the new information about the position and/or orientation of the vehicle seat 13 in the desired position and/or orientation P2 or an intermediate position and/or orientation, which may be intermediate to the first position and/or orientation P1 and the desired positon and/or orientation P2. The seat control unit 23 can then send the orientation signal X with the new information to the electronic control unit 41 via the path 42, as shown by the arrow 43. Furthermore, the electronic control unit 41 may be designed to adjust the position of the graphical user interface 31 from the first position Q1 to a second position Q2 as a function of the orientation signal X of the vehicle seat 13, such that a relative positon of the graphical user interface 31 relative to the vehicle seat 13 in the desired position and/or orientation P2 lies within the predefined tolerance. For example, as shown in FIG. 2, the user 12 can set the vehicle in an autonomous driving mode or a self-driving mode, such that in this case, the user 12 can lay back on the vehicle seat 13 in the new position and/or orientation P2 as shown in the FIG. 2. In this case the graphical user interface 31 is adjusted to the new position Q2, so that the user can have a clear view of the display contents, that is the at least one graphical display object 32, 33, 34, 35, and 36, of the graphical user interface 31.

The electronic control unit 41 may be designed to compute an estimated head position H1 of the head of the user 12 sitting on the vehicle seat 13 from the orientation signal X of the vehicle seat 13, wherein the electronic control unit 41 can be designed to adjust the position of the graphical user interface 31 in accordance with the estimated head position H1, such that the relative positon of the graphical user interface 31 relative to the estimated head position H1 lies within the predefined tolerance.

The vehicle 10 may include a gaze monitoring unit (gaze monitor) 62, for example a camera, which can be designed to monitor the position of the head of the user 12, wherein the electronic control unit 41 can be designed to adjust the position of the graphical user interface 31 in accordance with the monitored position and/or orientation of the head of the user 12, wherein a correction vector for correcting the information from the orientation signal X can be estimated, such that the relative position of the graphical user interface 31 relative to the position of the head of the user 12 lies within a predefined tolerance. Furthermore, the display device 30 may be attached to an edge 63 of the window panel 38 of the door 39 of the vehicle 10 by use of a holding arrangement (not shown in the drawings), wherein the holding arrangement can be designed to be movable.

Overall, the example shows how the display device 30 enables the display of the at least one graphic display object 32, 33, 34, 35, and 36 in an efficient manner, such that the graphical user interface 31 is coupled to the at least one vehicle element 13, 14, and 15, which in the example discussed above, is the vehicle seat 13. Furthermore, the display device 30 may always be maintained at a position and/or orientation which lies within a predefined tolerance from the at least one vehicle element 13, 14 and 15, as it is provided by the disclosure described herein.

A description has been provided with reference to various examples, but it will be understood that variations and modifications can be effected within the spirit and scope of the claims which may include the phrase "at least one of A, B, and C" as an alternative expression that means one or more of A, B, and C may be used, contrary to the holding in Superguide v. DIRECTV, 358 F3d 870, 69 USPQ2d 1865 (Fed. Cir. 2004). As an example, the scope of the expression "at least one of A, B, and C" is intended to include: (1) at least one of A, (2) at least one of B, (3) at least one of C, (4) at least one of A and at least one of B, (5) at least one of A and at least one of C, (6) at least one of B and at least one of C, and (7) at least one of A, at least one of B, and at least one of C.

The invention claimed is:

1. A vehicle, comprising:
   a vehicle seat;
   a display device including a graphical user interface configured to display a graphic display object, and to receive an input signal; and
   an electronic control unit configured to:
      receive the input signal from the display device and transmit the input signal to a device in the vehicle and/or receive a functionality signal from the device and transmit the functionality signal as an output signal to the display device,
      receive an orientation signal of the vehicle seat based on an adjustment of the vehicle seat, the orientation signal including information about at least one of a position of the vehicle seat and an orientation of the vehicle seat being in at least one of a corresponding first seat position and a corresponding first seat orientation, according to the adjustment of the vehicle seat,
      compute an estimated head-position of a head of a user sitting on the vehicle seat from the orientation signal, and
      adjust the position of the graphical user interface based on the estimated head-position, such that the position of the graphical user interface relative to the estimated head-position is within a predefined tolerance.

2. The vehicle according to claim 1, wherein the graphical user interface includes a pixel matrix.

3. The vehicle according to claim 2, wherein
   the display device includes a control circuitry configured to actuate a pixel element of the pixel matrix to display the graphic display object, and
   in a non-actuated state the pixel element is transparent, to adjust the position of the graphical user interface the control circuitry is configured to shift an actuation of pixel elements of the pixel matrix.

4. The vehicle according to claim 1, further comprising a door having a window panel,
   wherein
   the graphical user interface is integrated into the window panel of the door, such that the graphical user interface occupies at least a part of the window panel.

5. The vehicle according to claim 1, further comprising a door having a window panel,
   wherein
   the display device is attachable to an edge of the window panel of the door by a movable holder.

6. The vehicle according to claim 1, further comprising a door having a window panel,
   wherein
   the display device is mounted to a mechanical rack arranged on an edge of the window panel, and is movable via the mechanical rack from a first position to a second position based on the orientation signal of the vehicle seat.

7. The vehicle according to claim 1, wherein in response to at least one of a position of the vehicle seat and an orientation of the vehicle seat being changed, the electronic control unit is configured to dynamically adjust the position of the graphical user interface in real time, based on the orientation signal of the vehicle seat.

8. The vehicle according to claim 1, wherein
   the graphic display object digitally represents the vehicle seat, and
   in response to an input from a user to the graphic display object displayed on the graphical user interface changing at least one of a position of the vehicle seat and an orientation of the vehicle seat to the at least one of the corresponding first seat position and the corresponding first seat orientation, the electronic control unit is configured to change the at least one of the position of the vehicle seat and the orientation of the vehicle seat to the at least one of the corresponding first seat position and the corresponding first seat orientation and to dynamically adjust the position of the graphical user interface in real time, based on the orientation signal of the vehicle seat.

9. The vehicle according to claim 1, further comprising a memory configured to store a user-profile which includes at least one of a user-preferred position and a user-preferred orientation of the vehicle seat,
   wherein
   in response to a user logging into the user-profile, the electronic control unit is configured to automatically change the at least one of the position of the vehicle seat and the orientation of the vehicle seat to the at least one of the user-preferred position of the vehicle seat and the user-preferred orientation of the vehicle seat and to dynamically adjust the position of the graphical user interface in real time, based on the orientation signal of the vehicle seat which includes information about the at least one of the user-preferred position of the vehicle seat and the user-preferred orientation of the vehicle seat.

10. A vehicle, comprising:
a gaze monitor configured to monitor at least one of a position of a head of a user and an orientation of the head of the user,
a display device including a graphical user interface configured to display a graphic display object, and to receive an input signal; and
an electronic control unit configured to:
  receive the input signal from the display device and transmit the input signal to a device in the vehicle and/or receive a functionality signal from the device and transmit the functionality signal as an output signal to the display device,
  receive an orientation signal of a vehicle element based on an adjustment of the vehicle element, the orientation signal including information about at least one of a position of the vehicle element and an orientation of the vehicle element being in at least one of a corresponding first element position and a corresponding first element orientation, according to the adjustment of the vehicle element,
  adjust a position of the graphical user interface based on the at least one of the position of the head of the user and the orientation of the head of the user, and
the electronic control unit is configured to calculate a correction vector to correct the information of the orientation signal, such that the position of the graphical user interface is adjusted based on the correction vector and the position of the graphical user interface relative to the head of the user is maintained within a predefined tolerance.

11. A vehicle, comprising:
a display device including a graphical user interface configured to display a graphic display object, and to receive an input signal; and
an electronic control unit configured to:
  receive the input signal from the display device and transmit the input signal to a device in the vehicle and/or receive a functionality signal from the device and transmit the functionality signal as an output signal to the display device,
  receive an activation signal for a vehicle element, wherein the activation signal is generated in response to an input from a user via the graphical user interface, and the activation signal includes information about at least one of a desired element position and a desired element orientation,
  adjust at least one of a position of the vehicle element and an orientation of the vehicle element from at least one of a corresponding first element position and a corresponding first element orientation to the at least one of the desired element position and the desired element orientation based on the activation signal,
  receive an orientation signal of the vehicle element during and/or after the adjusting of the at least one of the position of the vehicle element and the orientation of the vehicle element, wherein the orientation signal includes information about the at least one of the position of the vehicle element and the orientation of the vehicle element being in the at least one of the desired element position and the desired element orientation, and
  adjust the position of the graphical user interface based on the orientation signal of the vehicle element, such that, when the vehicle element is positioned at the at least one of the desired element position and the desired element orientation, the position of the graphical user interface relative to the vehicle element is within a predefined tolerance.

12. The vehicle according to claim 11, further comprising a vehicle seat,
wherein
the vehicle element includes the vehicle seat, and the graphic display object includes a digital representation of the vehicle seat, and
the activation signal is generated in response to the input from the user to the graphic display object displayed on the graphical user interface.

13. The vehicle according to claim 12, wherein
the activation signal includes a plurality of sub-activation signals and the vehicle seat includes a plurality of vehicle seat parts, and
each of the plurality of sub-activation signals includes information about a corresponding vehicle seat part among the plurality of vehicle seat parts.

14. The vehicle according to claim 13, wherein the orientation signal includes information about at least one of a position of each of the plurality of vehicle seat parts and an orientation of each of the plurality of vehicle seat parts when the vehicle element is in the at least one of the desired element position and the desired element orientation.

* * * * *